US009147180B2

(12) United States Patent
Korkus et al.

(10) Patent No.: US 9,147,180 B2
(45) Date of Patent: Sep. 29, 2015

(54) DATA GOVERNANCE FOR EMAIL SYSTEMS

(75) Inventors: Ohad Korkus, Herzilia (IL); Yakov Faitelson, Elkana (IL); Ophir Kretzer-Katzir, Reut (IL); David Bass, Carmei Yoseph (IL)

(73) Assignee: VARONIS SYSTEMS, INC., New York, NY (US)

( * ) Notice: Subject to any disclaimer, the term of this patent is extended or adjusted under 35 U.S.C. 154(b) by 550 days.

(21) Appl. No.: 12/861,953

(22) Filed: Aug. 24, 2010

(65) Prior Publication Data
US 2012/0054283 A1 Mar. 1, 2012

(51) Int. Cl.
G06Q 10/10 (2012.01)
G06F 21/12 (2013.01)

(52) U.S. Cl.
CPC .............. *G06Q 10/107* (2013.01); *G06Q 10/10* (2013.01); *G06F 21/128* (2013.01)

(58) Field of Classification Search
CPC ..... G06Q 10/107; G06Q 10/10; G06F 21/128
USPC .......................................................... 709/206
See application file for complete search history.

(56) References Cited

U.S. PATENT DOCUMENTS

| 5,465,387 | A | 11/1995 | Mukherjee |
| 5,889,952 | A | 3/1999 | Hunnicutt et al. |
| 5,899,991 | A | 5/1999 | Karch |
| 6,308,173 | B1 | 10/2001 | Glasser et al. |
| 6,338,082 | B1 | 1/2002 | Schneider |
| 6,393,468 | B1 | 5/2002 | McGee |
| 6,772,350 | B1 | 8/2004 | Belani et al. |
| 6,928,439 | B2 | 8/2005 | Satoh |
| 7,031,984 | B2 | 4/2006 | Kawamura et al. |
| 7,068,592 | B1 | 6/2006 | Duvaut et al. |
| 7,117,370 | B2* | 10/2006 | Khan et al. ..................... 713/186 |
| 7,162,738 | B2* | 1/2007 | Dickinson et al. .............. 726/14 |
| 7,403,925 | B2* | 7/2008 | Schlesinger et al. ............ 705/64 |
| 7,421,740 | B2 | 9/2008 | Fey et al. |
| 7,555,482 | B2 | 6/2009 | Korkus |
| 7,606,801 | B2 | 10/2009 | Faitelson et al. |
| 7,716,240 | B2 | 5/2010 | Lim |
| 8,068,588 | B2* | 11/2011 | Ramanathan et al. ..... 379/88.13 |
| 8,281,372 | B1* | 10/2012 | Vidal ................................ 726/5 |
| 2003/0048301 | A1* | 3/2003 | Menninger ................... 345/764 |
| 2003/0051026 | A1 | 3/2003 | Carter et al. |

(Continued)

FOREIGN PATENT DOCUMENTS

CN 1588889 A 3/2005

OTHER PUBLICATIONS

An International Search Report and a Written Opinion both dated May 24, 2011 which issued during the prosecution of Applicant's PCT/IL11/00077.
USPTO OA mailed Oct. 31, 2008 in connection with U.S. Appl. No. 11/635,736.
USPTO OA mailed Aug. 1, 2008 in connection with U.S. Appl. No. 11/258,256.

(Continued)

*Primary Examiner* — Asghar Bilgrami
(74) *Attorney, Agent, or Firm* — Ladas & Parry LLP

(57) ABSTRACT

An enterprise email governance system including an enterprise-wide email communication item events monitoring subsystem providing at least near real time indications of email communication item events and an enterprise-wide email communication item events storage subsystem receiving inputs from the monitoring subsystem and providing at least near real time user accessibility to the email communication item events.

44 Claims, 11 Drawing Sheets

(56) References Cited

U.S. PATENT DOCUMENTS

| | | |
|---|---|---|
| 2003/0231207 A1 | 12/2003 | Huang |
| 2004/0186809 A1* | 9/2004 | Schlesinger et al. ............ 705/50 |
| 2004/0249847 A1 | 12/2004 | Wang et al. |
| 2004/0254919 A1 | 12/2004 | Giuseppini |
| 2005/0086529 A1 | 4/2005 | Buchsbaum |
| 2005/0108206 A1 | 5/2005 | Lam et al. |
| 2005/0120054 A1 | 6/2005 | Shulman et al. |
| 2005/0203881 A1 | 9/2005 | Sakamoto et al. |
| 2005/0246762 A1 | 11/2005 | Girouard et al. |
| 2005/0278334 A1 | 12/2005 | Fey et al. |
| 2006/0064313 A1 | 3/2006 | Steinbarth et al. |
| 2006/0168008 A1* | 7/2006 | Chen ............................ 709/206 |
| 2006/0184459 A1 | 8/2006 | Parida |
| 2006/0184530 A1 | 8/2006 | Song et al. |
| 2006/0277184 A1 | 12/2006 | Faitelson et al. |
| 2007/0061487 A1 | 3/2007 | Moore et al. |
| 2007/0073698 A1 | 3/2007 | Kanayama et al. |
| 2007/0094265 A1 | 4/2007 | Korkus |
| 2007/0101387 A1 | 5/2007 | Hua et al. |
| 2007/0112743 A1 | 5/2007 | Giampaolo et al. |
| 2007/0156693 A1 | 7/2007 | Soin et al. |
| 2007/0203872 A1 | 8/2007 | Flinn et al. |
| 2007/0244899 A1 | 10/2007 | Faitelson et al. |
| 2007/0266006 A1 | 11/2007 | Buss |
| 2007/0282855 A1 | 12/2007 | Chen et al. |
| 2008/0172720 A1 | 7/2008 | Botz et al. |
| 2008/0271157 A1 | 10/2008 | Faitelson et al. |
| 2009/0100058 A1 | 4/2009 | Faitelson et al. |
| 2009/0119298 A1 | 5/2009 | Faitelson et al. |
| 2009/0150981 A1 | 6/2009 | Amies et al. |
| 2009/0265780 A1 | 10/2009 | Korkus et al. |
| 2009/0320088 A1 | 12/2009 | Gill et al. |

OTHER PUBLICATIONS

USPTO OA mailed Feb. 12, 2008 in connection with U.S. Appl. No. 11/258,256.

USPTO OA mailed Dec. 14, 2010 in connection with U.S. Appl. No. 11/786,522.

USPTO OA mailed Dec. 14, 2010 in connection with U.S. Appl. No. 11/789,884.

USPTO OA mailed Jul. 9, 2010 in connection with U.S. Appl. No. 11/789,884.

International Search Report and a Written Opinion both dated May 20, 2010 issued during prosecution of PCT/IL10/00069.

Genunix; "Writing Filesystems—VFS and Vnode interfaces", 5 pages, Oct. 2007.

S.R. Kleiman; "Vnodes: An Architecture for Multiple File System Types in Sun UNIX", USENIX Association: Summer Conference Proceedings, Atlanta 1986, pp. 1-10.

Findutils—GNU Project—Free Software Foundation (FSF), 3 pages, Nov. 2006, 3 pages.

Sahadeb DE, et al; "Secure Access Control in a Multi-user Geodatabase", availible on the Internet at the URL http://www10.giscafe.com.2005.

Sara C. Madeira, et al; "Biclustering Algorithms for Biological Data Analysis: A Survey", Mar. 2004; http://www.cs.princeton.edu/courses/archive/spr05/cos598E/bib/bicluster.pdf.

Sara C. Madeira; "Clustering, Fuzzy Clustering and Biclustering: An Overview", pp. 31-53, Jun. 27, 2003.

USPTO NFOA mailed Sep. 14, 2012 in connection with U.S. Appl. No. 12/867,967.

* cited by examiner

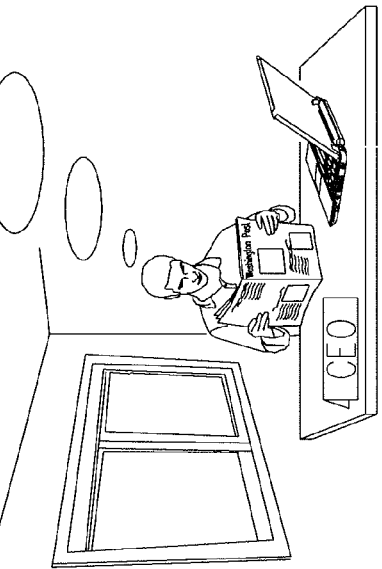

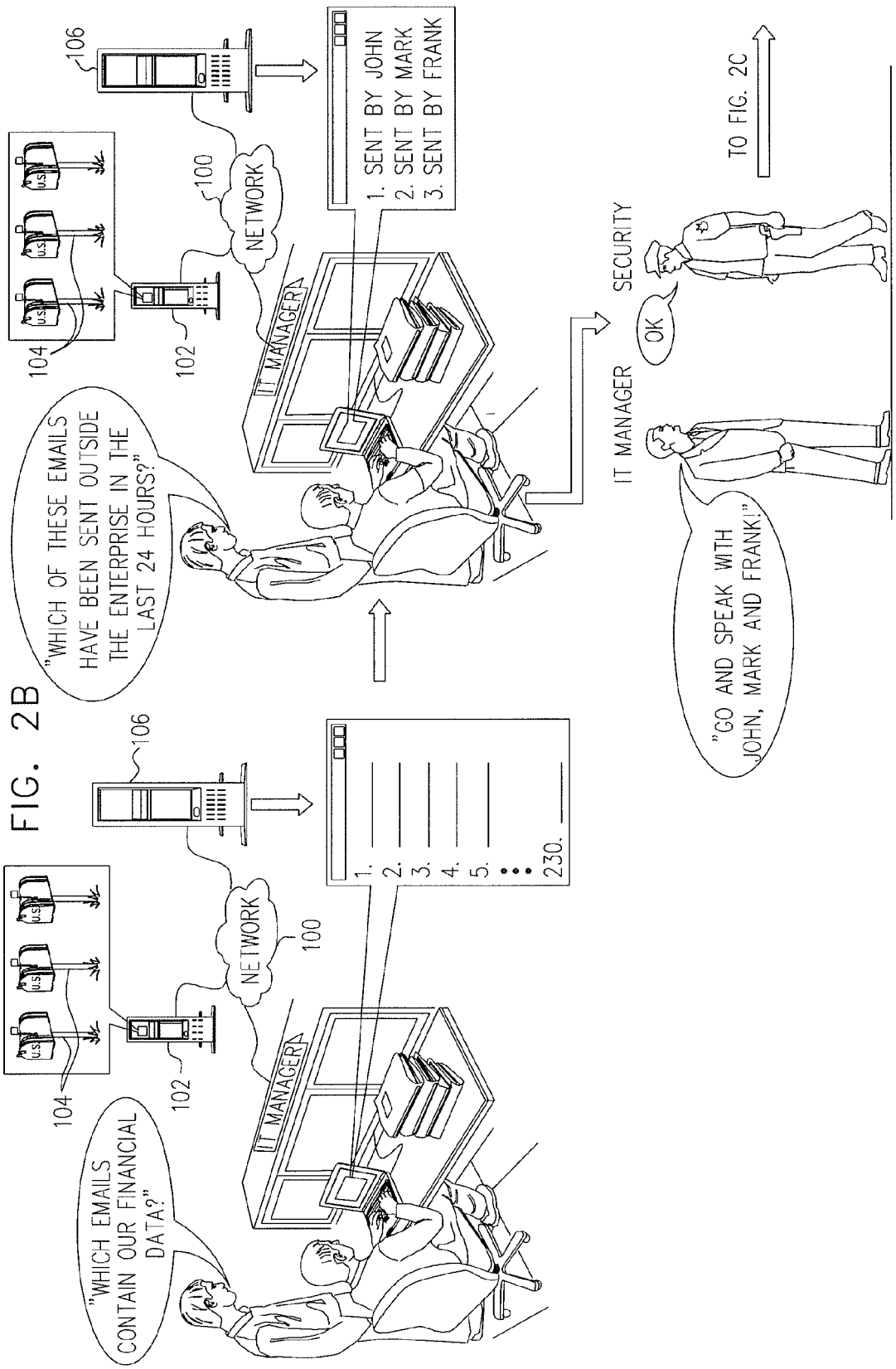

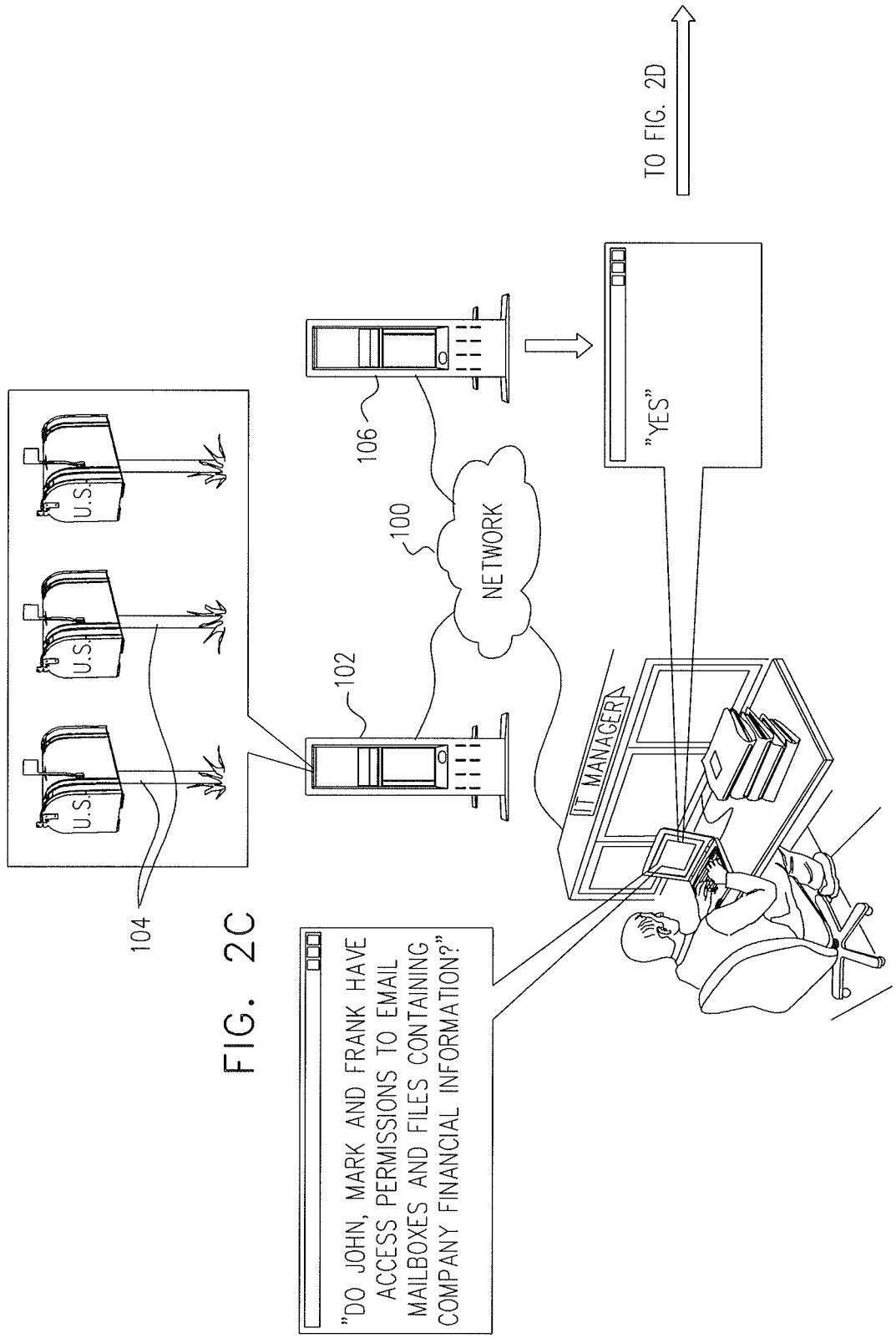

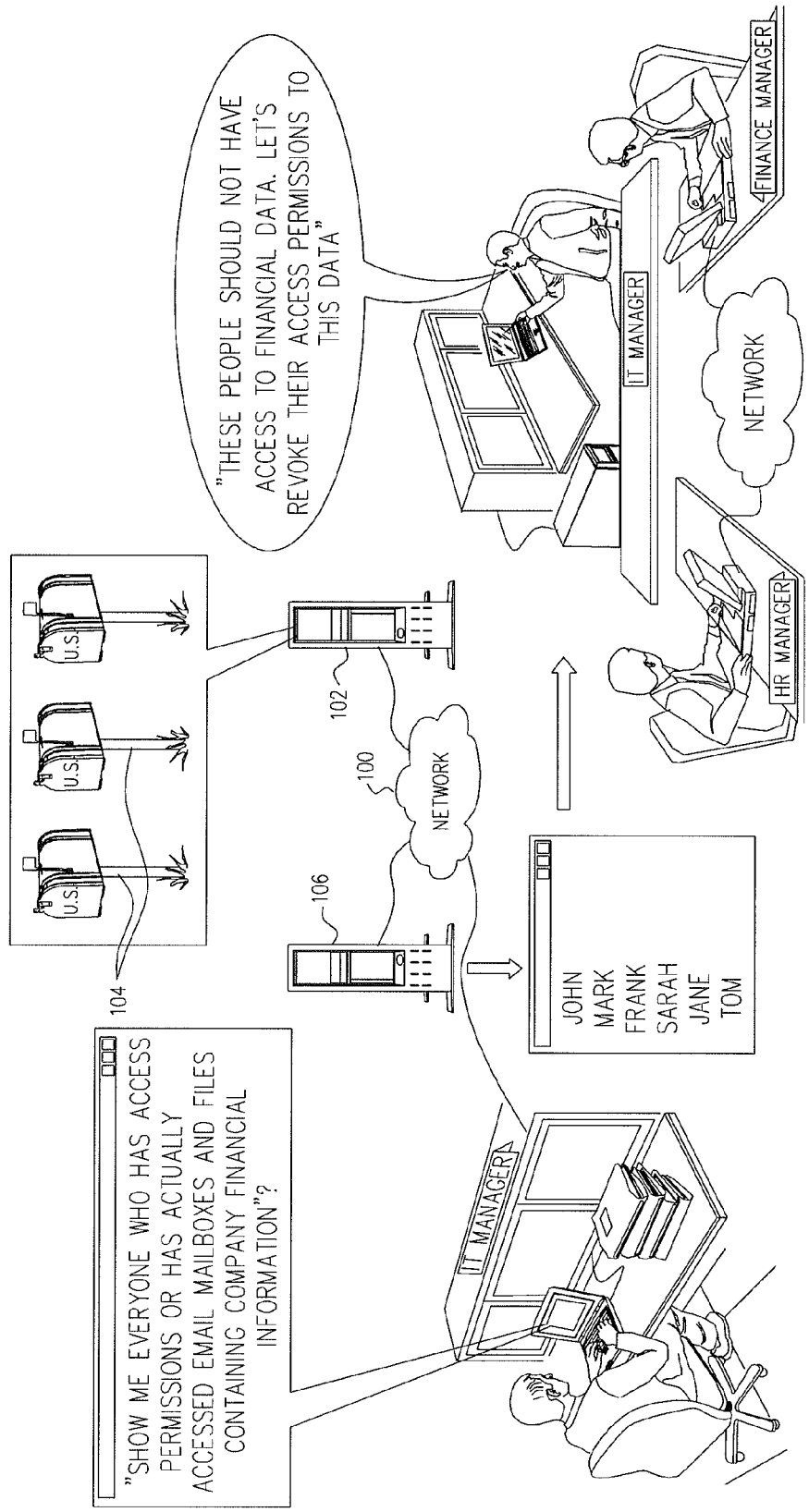

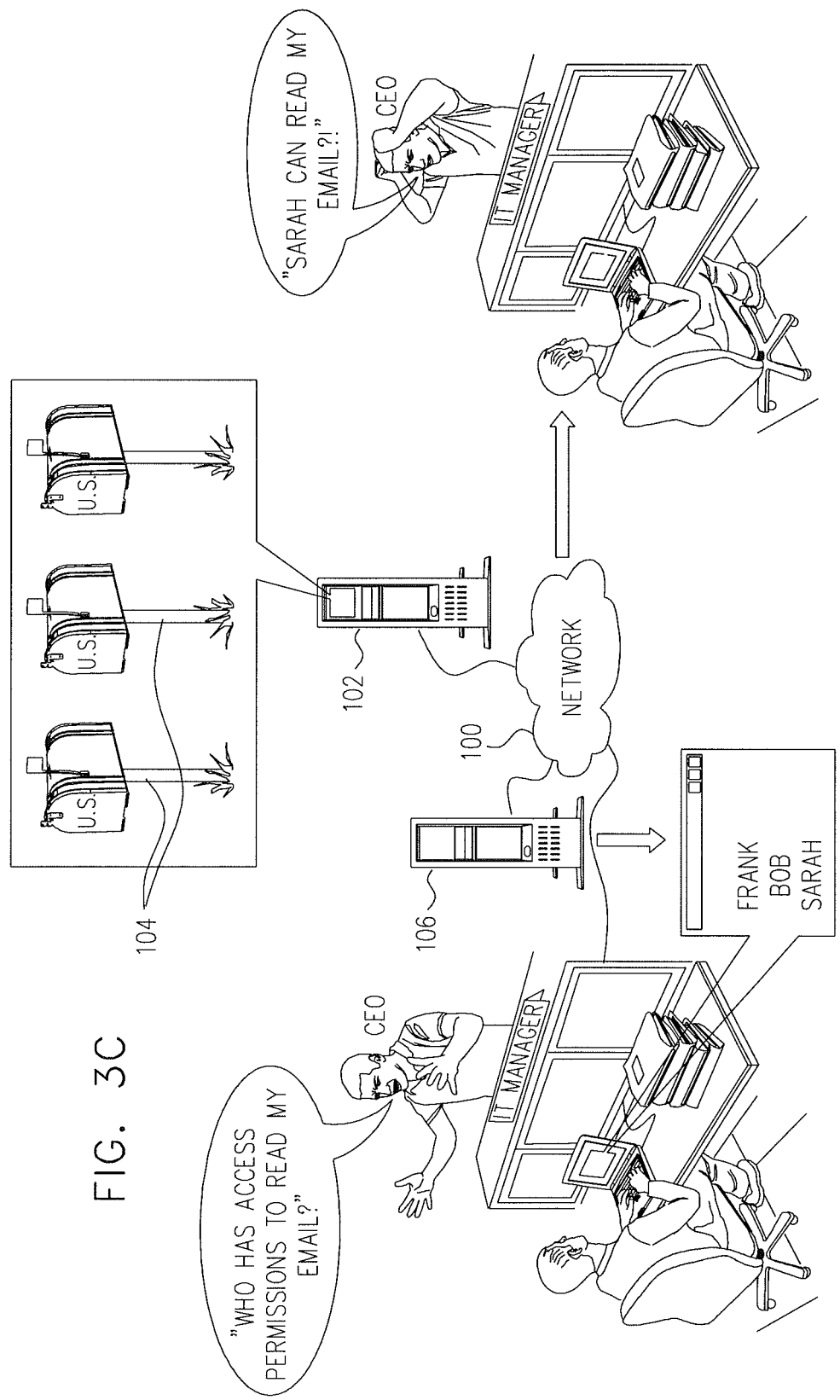

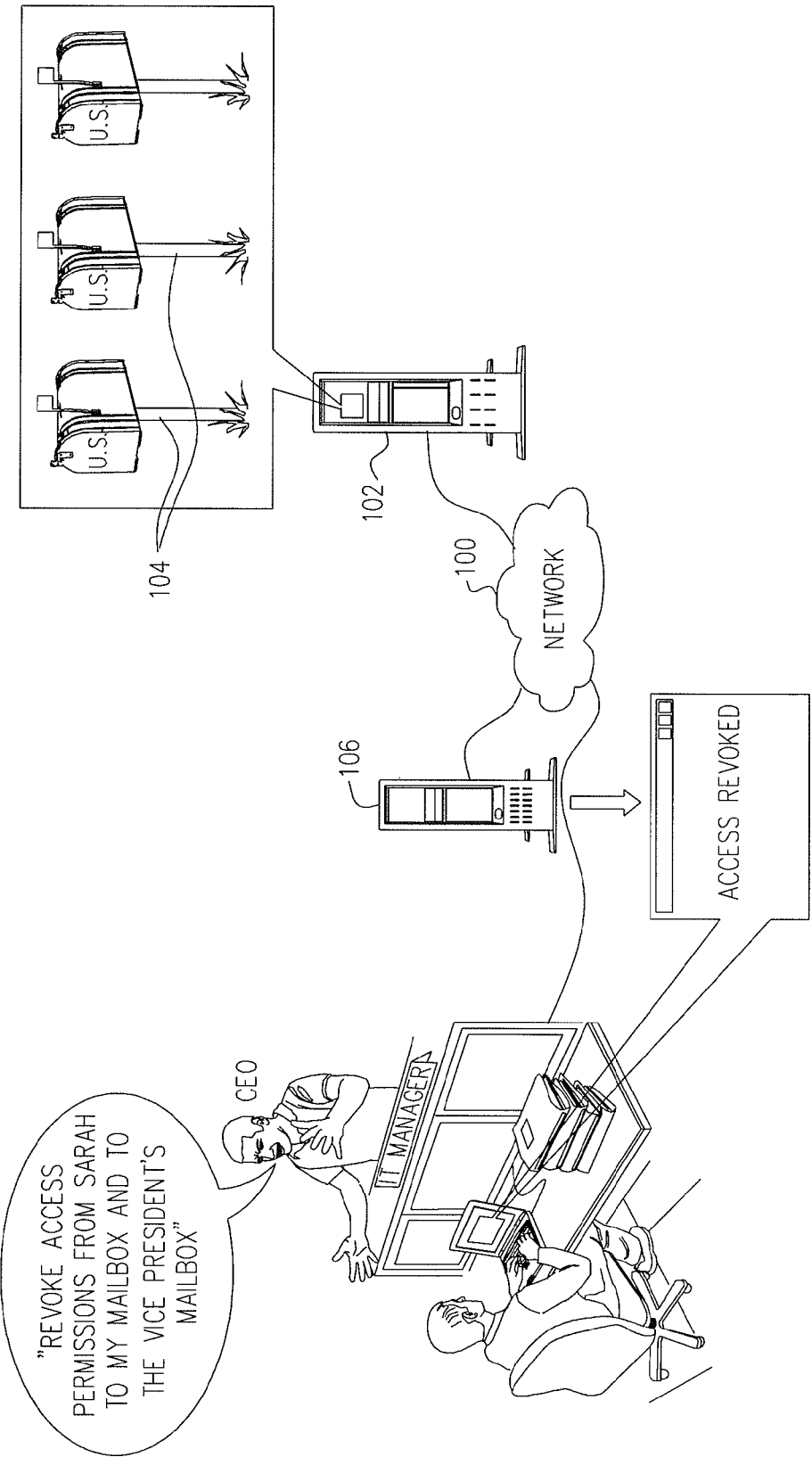

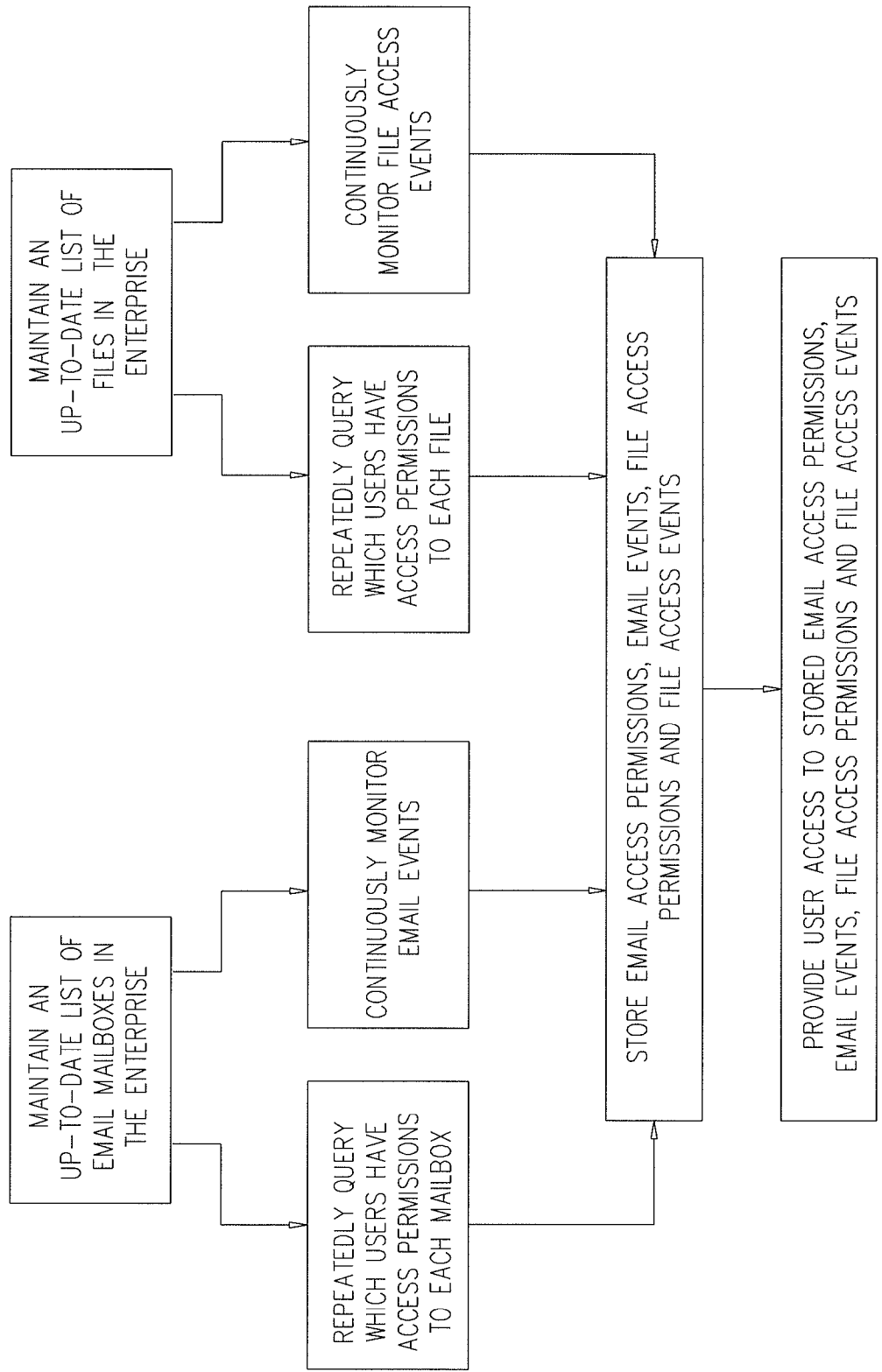

DATA GOVERNANCE FOR EMAIL SYSTEMS

REFERENCE TO RELATED APPLICATIONS

Reference is made to the following patents and patent applications, owned by assignee, the disclosures of which are hereby incorporated by reference:

U.S. Pat. Nos. 7,555,482 and 7,606,801; and

U.S. Published Patent Application Nos. 2007/0244899, 2008/0271157, 2009/0100058, 2009/0119298 and 2009/0265780.

FIELD OF THE INVENTION

The present invention relates to data management systems and methodologies generally and more particularly to data access permission management systems and methodologies.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482 and 7,606,801; and U.S. Published Patent Application Nos.: 2003/0051026; 2004/0249847; 2005/0108206; 2005/0203881; 2005/0120054; 2005/0086529; 2006/0064313; 2006/0184530; 2006/0184459 and 2007/0203872.

SUMMARY OF THE INVENTION

The present invention seeks to provide improved data access permission management systems and methodologies.

There is thus provided in accordance with a preferred embodiment of the present invention an enterprise email governance system including an enterprise-wide email communication item events monitoring subsystem providing at least near real time indications of email communication item events and an enterprise-wide email communication item events storage subsystem receiving inputs from the monitoring subsystem and providing at least near real time user accessibility to the email communication item events.

In accordance with a preferred embodiment of the present invention the enterprise-wide email communication item events monitoring subsystem provides at least near real time indications of sending and receiving email communication items. Additionally or alternatively, the enterprise-wide email communication item events monitoring subsystem provides at least near real time indications of opening email communication items. Additionally or alternatively, the enterprise-wide email communication item events monitoring subsystem provides at least near real time indications of forwarding email communication items. Additionally or alternatively, the enterprise-wide email communication item events monitoring subsystem provides at least near real time indications of saving email communication items.

Preferably, the enterprise-wide email communication item events storage subsystem provides at least near real time indications of sending and receiving of email communication items. Additionally or alternatively, the enterprise-wide email communication item events storage subsystem provides at least near real time indications of opening email communication items. Additionally or alternatively, the enterprise-wide email communication item events storage subsystem provides at least near real time indications of forwarding email communication items. Additionally or alternatively, the enterprise-wide email communication item events storage subsystem provides at least near real time indications of saving email communication items. Additionally or alternatively, the enterprise-wide email communication item events storage subsystem provides at least near real time indications of email communication item events involving selected at least pairs of entities.

There is also provided in accordance with another preferred embodiment of the present invention an enterprise email governance system including an enterprise-wide email communication item access permissions accounting subsystem providing indications of email communication item access permissions and an enterprise-wide email communication item events accounting subsystem providing at least near real time indications of email communication item events.

Preferably, the email communication item access permissions include email communication item modification permissions. Additionally, the email communication item access permissions include email communication item creation and deletion permissions. Additionally, the email communication item access permissions include email communication item sending, replying and forwarding permissions. Additionally, the email communication item access permissions include email communication item reading permissions.

Preferably, the enterprise-wide email communication item events accounting subsystem provides at least near real time indications of sending and receiving of email communication items. Additionally or alternatively, the enterprise-wide email communication item events accounting subsystem provides at least near real time indications of opening email communication items. Additionally or alternatively, the enterprise-wide email communication item events accounting subsystem provides at least near real time indications of forwarding email communication items. Additionally or alternatively, the enterprise-wide email communication item events accounting subsystem provides at least near real time indications of saving email communication items. Additionally or alternatively, the enterprise-wide email communication item events accounting subsystem provides at least near real time indications of email communication item events involving selected at least pairs of entities.

There is further provided in accordance with yet another preferred embodiment of the present invention an enterprise email and file governance system including an enterprise-wide email communication items monitoring subsystem providing at least one of at least near real time indications of email communication item events and indications of email communication item access permissions, an enterprise-wide file monitoring subsystem providing at least one of at least near real time indications of file access events and indications of file access permissions, and an enterprise-wide monitored events storage subsystem receiving inputs from at least one of the monitoring subsystems and providing at least near real time user accessibility to the email communication items and to at least one of the email communication item access events, the indications of email communication item access permissions, the file access events and the indications of file access permissions.

In accordance with a preferred embodiment of the present invention the at least near real time user accessibility to the email communication items and to at least one of the email communication item access events and the indications of email communication item access permissions includes filtering functionality operative to provide at least near real time user accessibility to the email communication items, and to the access events and the access permissions thereof, which match at least one of a multiplicity of email communication items filtering criteria.

Preferably, the multiplicity of email communication items filtering criteria includes keywords. Additionally or alternatively, the multiplicity of email communication items filtering criteria includes email communication item send time. Additionally or alternatively, the multiplicity of email communication items filtering criteria includes email communication item receive time. Additionally or alternatively, the multiplicity of email communication items filtering criteria includes email communication item recipients. Additionally or alternatively, the multiplicity of email communication items filtering criteria includes email communication item sender. Additionally or alternatively, the multiplicity of email communication items filtering criteria includes email communication item subject. Additionally or alternatively, the multiplicity of email communication items filtering criteria includes email communication item attachments characteristics. Preferably, the communication item attachments characteristics include attachment size, attachment subject and attachment content.

There is yet further provided in accordance with still another preferred embodiment of the present invention an enterprise email governance method including monitoring enterprise-wide email communication item events and providing at least near real time indications of email communication item events and storing monitored enterprise-wide email communication item events and providing at least near real time user accessibility to the email communication item events.

In accordance with a preferred embodiment of the present invention, the monitoring enterprise-wide email communication item events provides at least near real time indications of sending and receiving email communication items. Additionally or alternatively, the monitoring enterprise-wide email communication item events provides at least near real time indications of opening email communication items. Additionally or alternatively, the monitoring enterprise-wide email communication item events provides at least near real time indications of forwarding email communication items. Additionally or alternatively, the monitoring enterprise-wide email communication item events provides at least near real time indications of saving email communication items.

Preferably, the method includes providing at least near real time indications of sending and receiving of email communication items. Additionally or alternatively, the method includes providing at least near real time indications of opening email communication items. Additionally or alternatively, the method includes providing at least near real time indications of forwarding email communication items. Additionally or alternatively, the method includes providing at least near real time indications of saving email communication items. Additionally or alternatively, the method includes providing at least near real time indications of email communication item events involving selected at least pairs of entities.

There is also provided in accordance with another preferred embodiment of the present invention an enterprise email governance method including providing indications of email communication item access permissions and providing at least near real time indications of email communication item events.

Preferably, the email communication item access permissions include email communication item modification permissions. Additionally, the email communication item access permissions include email communication item creation and deletion permissions. Additionally, the email communication item access permissions include email communication item sending, replying and forwarding permissions. Additionally, the email communication item access permissions include email communication item reading permissions.

Preferably, the method includes providing at least near real time indications of sending and receiving of email communication items. Additionally or alternatively, the method includes providing at least near real time indications of opening email communication items. Additionally or alternatively, the method includes providing at least near real time indications of forwarding email communication items. Additionally or alternatively, the method includes providing at least near real time indications of saving email communication items. Additionally or alternatively, the method includes providing at least near real time indications of email communication item events involving selected at least pairs of entities.

There is further provided in accordance with yet another preferred embodiment of the present invention an enterprise email and file governance method including monitoring enterprise-wide email communication items and providing at least one of at least near real time indications of email communication item events and indications of email communication item access permissions, monitoring files across the enterprise and providing at least one of at least near real time indications of file access events and indications of file access permissions, and storing enterprise-wide monitored events and providing at least near real time user accessibility to the email communication items and to at least one of the email communication item access events, the indications of email communication item access permissions, the file access events and the indications of file access permissions.

In accordance with a preferred embodiment of the present invention the at least near real time user accessibility to the email communication items and to at least one of the email communication item access events and the indications of email communication item access permissions includes filtering functionality operative to provide at least near real time user accessibility to the email communication items, and to the access events and the access permissions thereof, which match at least one of a multiplicity of email communication items filtering criteria.

Preferably, the multiplicity of email communication items filtering criteria includes keywords. Additionally or alternatively, the multiplicity of email communication items filtering criteria includes email communication item send time. Additionally or alternatively, the multiplicity of email communication items filtering criteria includes email communication item receive time. Additionally or alternatively, the multiplicity of email communication items filtering criteria includes email communication item recipients. Additionally or alternatively, the multiplicity of email communication items filtering criteria includes email communication item sender. Additionally or alternatively, the multiplicity of email communication items filtering criteria includes email communication item subject. Additionally or alternatively, the multiplicity of email communication items filtering criteria includes email communication item attachments characteristics. Preferably, the communication item attachments characteristics include attachment size, attachment subject and attachment content.

BRIEF DESCRIPTION OF THE DRAWINGS

The present invention will be understood and appreciated more fully from the following detailed description, taken in conjunction with the drawings in which:

FIGS. 2A, 2B, 2C and 2D illustrate a typical scenario in which the system and methodology of FIG. 1 is particularly useful;

FIGS. 3A, 3B, 3C, 3D and 3E illustrate another typical scenario in which the system and methodology of FIG. 1 is particularly useful; and FIG. 4 is a simplified flowchart indicating steps in the operation of the enterprise email governance system of FIG. 1.

DETAILED DESCRIPTION OF A PREFERRED EMBODIMENT

Figure 1:
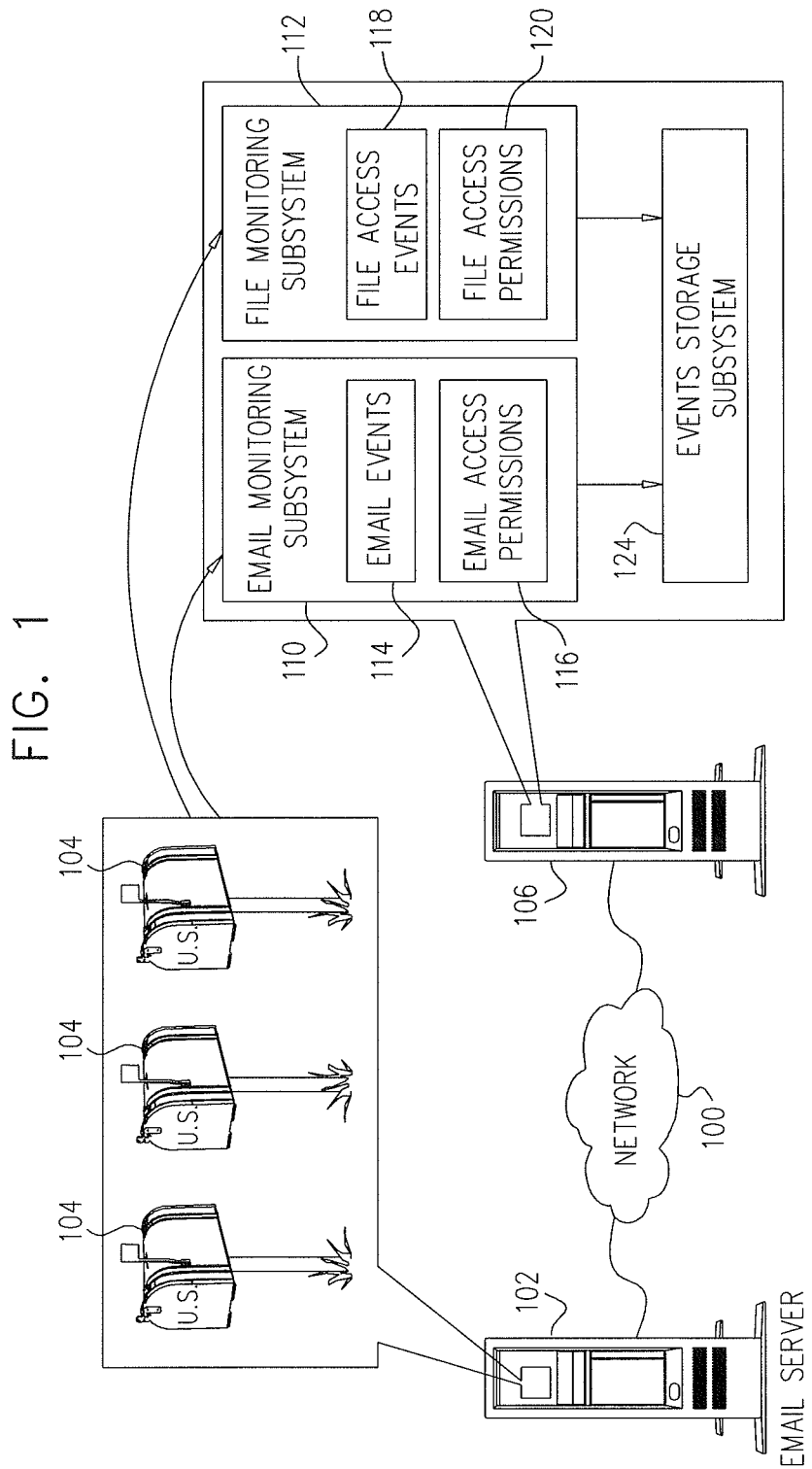
FIG. 1 is a simplified functional block diagram illustrating an enterprise email governance system constructed and operative in accordance with a preferred embodiment of the present invention.

Reference is now made to FIG. 1 which illustrates an enterprise email governance system constructed and operative in accordance with a preferred embodiment of the present invention. The enterprise email governance system of FIG. 1 is useful with an email network 100 including at least one email server 102 hosting a multiplicity of email mailboxes 104. The system preferably resides on at least one server 106 which communicates with email server 102 and preferably includes an enterprise-wide email communication items monitoring subsystem 110 and an enterprise-wide email file monitoring subsystem 112.

Preferably, the enterprise-wide email communication item events monitoring subsystem 110 includes at least one of:
  functionality 114 for providing at least near real time indications of email communication item events; and
  functionality 116 for providing indications of email communication item access permissions.

Preferably, the enterprise-wide email file monitoring subsystem 112 includes at least one of:
  functionality 118 for providing at least near real time indications of file access events; and
  functionality 120 for providing indications of file access permissions.

Email communication items are typically emails, calendar appointments, email contact entries, tasks and journal entries.

Email communication item events may include creating, sending, receiving, viewing, modifying, deleting, forwarding and replying to emails, calendar appointments, email contact entries, tasks and journal entries.

Email communication item access permissions may include permissions for a user to create, read, modify, send, forward, reply to and delete email communication items residing within the user's mailbox or within another user's mailbox.

Preferably, the system also includes an enterprise-wide monitored events storage subsystem 124, receiving inputs from at least one of the monitoring subsystems 110 and 112 and providing at least near real time user accessibility to the email communication items and to at least one of the email communication item access events, the indications of email communication item access permissions, the file access events and the indications of file access permissions.

Reference is now made to FIGS. 2A, 2B, 2C and 2D, which illustrate a typical scenario in which the system and methodology of FIG. 1 is particularly useful.

As seen in FIG. 2A, a CEO of a publicly traded company notices that financial data relating to his company has been leaked to the press. The CEO calls in the IT manager and demands that the IT manager find the miscreant.

As shown in FIG. 2B, the IT manager, employing the system of the present invention searches in real time or near real time to identify emails containing the financial data, identified either by the title of the email or its content. He finds 230 emails containing this data and then narrows his search to emails sent to recipients outside the enterprise within the last 24 hours. Upon identifying three such emails, he identifies the senders and dispatches security officers to interview them.

FIG. 2C shows that the IT manager, employing the system, immediately ascertains the access permissions and the actual accesses of the suspected miscreants to email resources and preferably also to non-email file resources of the enterprise.

FIG. 2D shows that the IT manager, further employing the system of the present invention, identifies in real time or near real time all entities in the enterprise who have actually accessed emails or files containing the financial information as well as all entities in the enterprise who have access permissions to emails or files containing the financial information. Upon consultation with other executives, the IT manager can change access permissions as appropriate in order to try to prevent future leaks.

Reference is now made to FIGS. 3A, 3B, 3C, 3D and 3E, which illustrate another typical scenario in which the system and methodology of FIG. 1 is particularly useful.

Figure 3A:
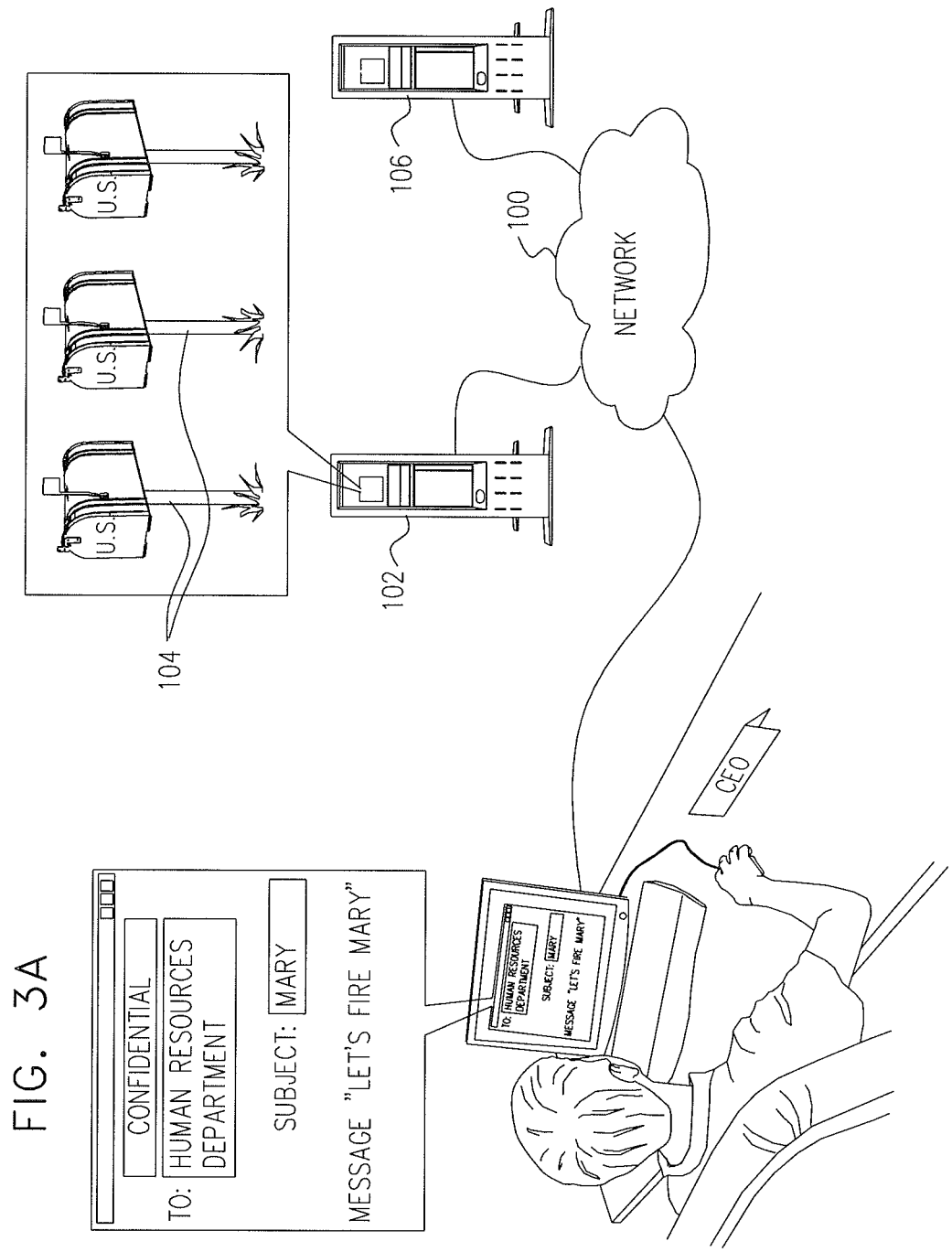

As seen in FIG. 3A, a CEO of a publicly traded company composes an email message to the human resources department of the company, discussing plans to terminate the employment of Mary, an employee of the company.

Figure 3B:

As shown in FIG. 3B, to the surprise of the CEO, Mary, in obvious distress, approaches the CEO demanding to know why her employment at the company is being terminated.

As shown in FIG. 3C, the CEO speaks with the IT manager and demands that the IT manager find who has access permissions to his emails, and to thereby discover who may have leaked the contents of his confidential email to Mary. The IT manager, employing the system of the present invention searches in real time or near real time to identify which employees have access permissions to the CEO's mailbox, and discovers that Frank, Bob, and Sarah all have access permissions to read the CEO's email. The CEO is surprised and annoyed to learn that Sarah, a good friend of Mary, has access permissions to read his email.

Figure 3D:
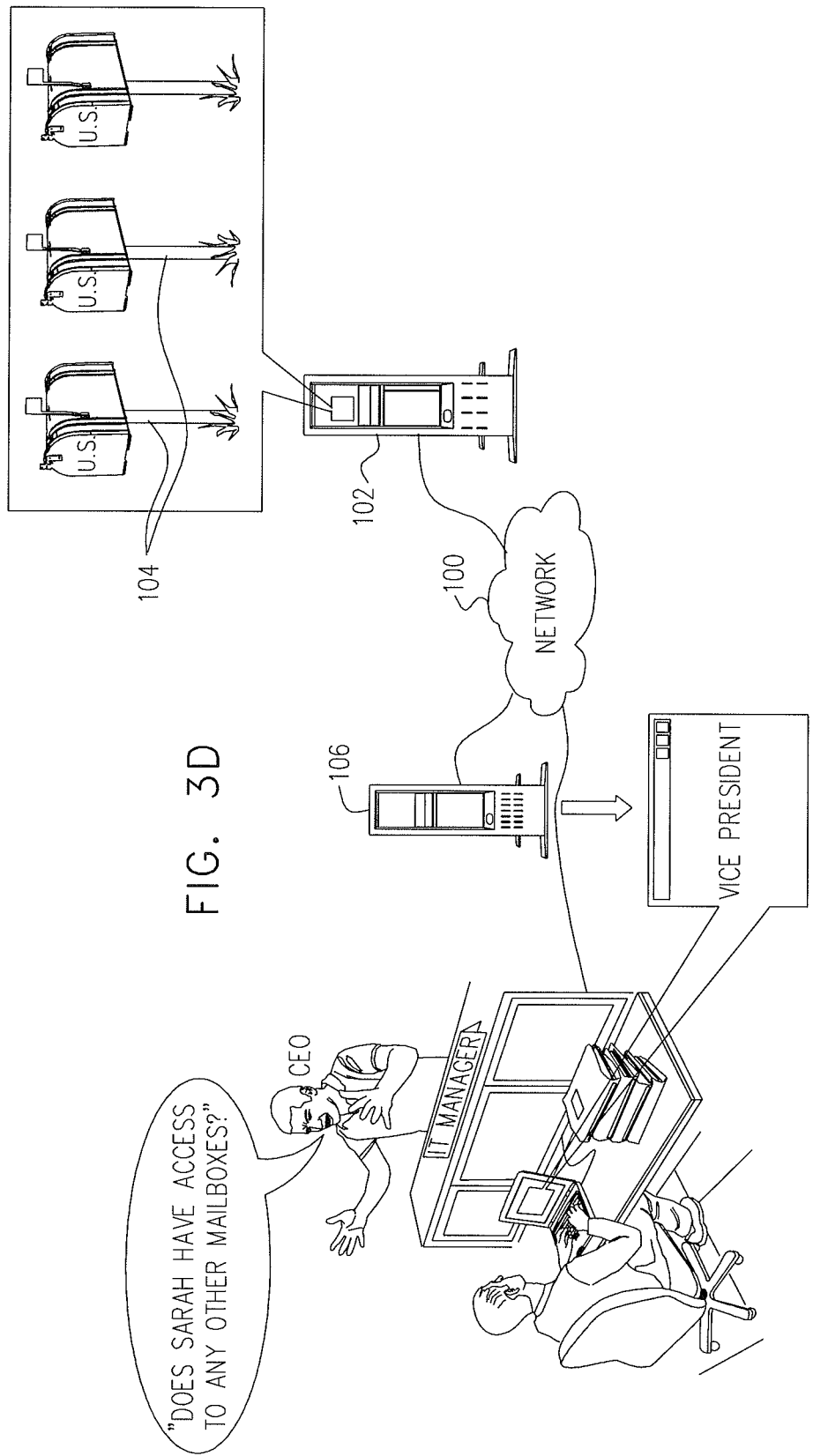

FIG. 3D shows the CEO requesting from the IT Manager to provide a list of all mailboxes to which Sarah has access permissions. As seen in FIG. 3D, the IT manager, employing the system, discovers that Sarah also has access permissions to read the Vice President's email.

FIG. 3E shows the CEO demanding that Sarah's access permissions to the Vice President's email and to his own email be revoked immediately. As seen in FIG. 3E, the IT Manager, employing the system, revokes Sarah's access permissions to the executives' mailboxes.

Reference is now made to FIG. 4, which is a simplified flowchart indicating steps in the operation of the enterprise email governance system of FIG. 1. As shown in FIG. 4, the system continuously maintains an up-to-date list of all the email mailboxes residing on any email server in the enterprise as well as an up-to-date list of all the files residing on any file server or storage device in the enterprise.

As also shown in FIG. 4, the system maintains a list of users having email communication item access permissions to each of the mailboxes by repeatedly querying the email servers for access permissions information. Additionally, the system also continuously monitors the email servers for email communication item access events. The system also maintains a list of users having access permissions to each of the files in the enterprise. Additionally, the system continuously monitors the enterprise file servers and storage devices for file access events.

As further shown in FIG. 4, the system stores information pertaining to email communication item access permissions, email communication item access events, file access permissions and file access events. The system also provides user accessibility to the stored email communication item access permissions, email communication item access events, file access permissions and file access events. The user accessibility functionality includes filtering functionality operative to provide user accessibility to access permissions and access events relating to email communication items which match at least one of a multiplicity of email communication items filtering criteria, as well as filtering functionality operative to provide user accessibility to access permissions and access events relating to files which match at least one of a multiplicity of file filtering criteria.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. An enterprise email governance system useful with enterprise email systems in which multiple users have access to at least some email communication items, the system comprising:
an enterprise-wide email communication item events monitoring subsystem operative for monitoring email servers and identifying a first plurality of entities in the enterprise who have actually accessed emails as well as a second plurality of entities in the enterprise who have access permissions to emails, said first plurality of entities being a subset of said second plurality of entities, said second plurality of entities comprising entities other than senders or recipients of said emails, said subsystem also being operative for providing at least near real time indications of email communication item events associated with said first and second plurality of entities and for providing identification of the entity other than the sender or recipient of said email who had at least one of access permissions or actual access to said email, said email communication item events comprising at least one of:
creating email communication items;
sending email communication items;
receiving email communication items;
viewing email communication items;
modifying email communication items;
deleting email communication items;
opening email communication items;
forwarding email communication items; and
saving email communication items; and
an enterprise-wide email communication item events storage subsystem receiving inputs from said monitoring subsystem and providing at least near real time user accessibility to said email communication item events.

2. An enterprise email governance system according to claim 1 and wherein said enterprise-wide email communication item events storage subsystem provides at least near real time indications of sending and receiving of email communication items.

3. An enterprise email governance system according to claim 1 and wherein said enterprise-wide email communication item events storage subsystem provides at least near real time indications of opening email communication items.

4. An enterprise email governance system according to claim 1 and wherein said enterprise-wide email communication item events storage subsystem provides at least near real time indications of forwarding email communication items.

5. An enterprise email governance system according to claim 1 and wherein said enterprise-wide email communication item events storage subsystem provides at least near real time indications of saving email communication items.

6. An enterprise email governance system according to claim 1 and wherein said enterprise-wide email communication item events storage subsystem provides at least near real time indications of email communication item events involving selected at least pairs of entities.

7. An enterprise email governance system useful with enterprise email systems in which multiple users have access to at least some email communication items, the system comprising:
an enterprise-wide email communication item access permissions accounting subsystem identifying a first plurality of entities in the enterprise who have email communication item access permissions and providing indications of email communication item access permissions associated with said first plurality of entities, said email communication item access permissions comprising user access permissions for at least one of:
creating email communication items;
sending email communication items;
reading email communication items;
modifying email communication items;
deleting email communication items;
opening email communication items; and
forwarding email communication items; and
an enterprise-wide email communication item events accounting subsystem identifying a second plurality of entities in the enterprise who have actually accessed emails, said second plurality of entities being a subset of said first plurality of entities, said first plurality of entities comprising entities other than senders or recipients of said emails, said subsystem also being operative for providing at least near real time indications of email communication item events associated with said second plurality of entities and for providing identification of the entity other than the sender or recipient of said email who had at least one of access permissions or actual access to said email, said email communication item events comprising at least one of:
creating email communication items;
sending email communication items;
receiving email communication items;
reading email communication items;
modifying email communication items;
deleting email communication items;
opening email communication items;
forwarding email communication items; and
saving email communication items.

8. An enterprise email governance system according to claim 7 and wherein said email communication item access permissions include email communication item modification permissions.

9. An enterprise email governance system according to claim 7 and wherein said email communication item access permissions include email communication item creation and deletion permissions.

10. An enterprise email governance system according to claim 7 and wherein said email communication item access permissions include email communication item sending, replying and forwarding permissions.

11. An enterprise email governance system according to claim 7 and wherein said email communication item access permissions include email communication item reading permissions.

12. An enterprise email governance system according to claim 7 and wherein said enterprise-wide email communication item events accounting subsystem provides at least near real time indications of email communication item events involving selected at least pairs of entities.

13. An enterprise email and file governance system useful with enterprise email systems in which multiple users have access to at least some email communication items, the system comprising:
   an enterprise-wide email communication items monitoring subsystem operative for monitoring email servers and identifying a first plurality of entities in the enterprise who have actually accessed emails as well as a second plurality of entities in the enterprise who have access permissions to emails, said first plurality of entities being a subset of said second plurality of entities, said second plurality of entities comprising entities other than senders or recipients of said emails, said subsystem also being operative for providing identification of the entity other than the sender or recipient of said email who had at least one of access permissions or actual access to said email and for providing at least one of:
      at least near real time indications of email communication item events associated with said first and second plurality of entities, said email communication item events comprising at least one of:
         creating email communication items;
         sending email communication items;
         receiving email communication items;
         reading email communication items;
         modifying email communication items;
         deleting email communication items;
         opening email communication items;
         forwarding email communication items; and
         saving email communication items; and
      indications of email communication item access permissions associated with said second plurality of entities, said email communication item access permissions comprising user access permissions for at least one of:
         creating email communication items;
         sending email communication items;
         reading email communication items;
         modifying email communication items;
         deleting email communication items;
         opening email communication items; and
         forwarding email communication items;
   an enterprise-wide file monitoring subsystem providing at least one of:
      at least near real time indications of file access events; and
      indications of file access permissions; and
   an enterprise-wide monitored events storage subsystem receiving inputs from at least one of said monitoring subsystems and providing at least near real time user accessibility to said email communication items and to at least one of said email communication item access events, said indications of email communication item access permissions, said file access events and said indications of file access permissions.

14. An enterprise email governance system according to claim 13 and wherein said at least near real time user accessibility to said email communication items and to at least one of said email communication item access events and said indications of email communication item access permissions includes filtering functionality operative to provide at least near real time user accessibility to said email communication items, and to said access events and said access permissions thereof, which match at least one of a multiplicity of email communication items filtering criteria.

15. An enterprise email governance system according to claim 14 and wherein said multiplicity of email communication items filtering criteria includes keywords.

16. An enterprise email governance system according to claim 14 and wherein said multiplicity of email communication items filtering criteria includes email communication item send time.

17. An enterprise email governance system according to claim 14 and wherein said multiplicity of email communication items filtering criteria includes email communication item receive time.

18. An enterprise email governance system according to claim 14 and wherein said multiplicity of email communication items filtering criteria includes email communication item recipients.

19. An enterprise email governance system according to claim 14 and wherein said multiplicity of email communication items filtering criteria includes email communication item sender.

20. An enterprise email governance system according to claim 14 and wherein said multiplicity of email communication items filtering criteria includes email communication item subject.

21. An enterprise email governance system according to claim 14 and wherein said multiplicity of email communication items filtering criteria includes email communication item attachments characteristics.

22. An enterprise email governance system according to claim 21 and wherein said communication item attachments characteristics include attachment size, attachment subject and attachment content.

23. An enterprise email governance method useful with enterprise email systems in which multiple users have access to at least some email communication items, the method comprising:
   monitoring email servers and identifying a first plurality of entities in the enterprise who have actually accessed emails as well as a second plurality of entities in the enterprise who have access permissions to emails, said first plurality of entities being a subset of said second plurality of entities, said second plurality of entities comprising entities other than senders or recipients of said emails, and for providing at least near real time indications of email communication item events associated with said first and second plurality of entities and identification of the entity other than the sender or recipient of said email who had at least one of access permissions or actual access to said email, said email communication item events comprising at least one of:
      creating email communication items;
      sending email communication items;
      receiving email communication items;
      reading email communication items;
      modifying email communication items;
      deleting email communication items;
      opening email communication items;
      forwarding email communication items; and
      saving email communication items; and
   storing monitored enterprise-wide email communication item events and providing at least near real time user accessibility to said email communication item events.

24. An enterprise email governance method according to claim 23 and wherein said method includes providing at least near real time indications of sending and receiving of email communication items.

25. An enterprise email governance method according to claim 23 and wherein said method includes providing at least near real time indications of opening email communication items.

26. An enterprise email governance method according to claim 23 and wherein said method includes providing at least near real time indications of forwarding email communication items.

27. An enterprise email governance method according to claim 23 and wherein said method includes providing at least near real time indications of saving email communication items.

28. An enterprise email governance method according to claim 23 and wherein said method includes providing at least near real time indications of email communication item events involving selected at least pairs of entities.

29. An enterprise email governance method useful with enterprise email systems in which multiple users have access to at least some email communication items, the method comprising:
  identifying a first plurality of entities in the enterprise who have email communication item access permissions and providing indications of email communication item access permissions associated with said first plurality of entities, said email communication item access permissions comprising user access permissions for at least one of:
    creating email communication items;
    sending email communication items;
    reading email communication items;
    modifying email communication items;
    deleting email communication items;
    opening email communication items; and
    forwarding email communication items; and
  identifying a second plurality of entities in the enterprise who have actually accessed emails, said second plurality of entities being a subset of said first plurality of entities, said first plurality of entities comprising entities other than senders or recipients of said emails, and providing at least near real time indications of email communication item events associated with said second plurality of entities and identification of the entity other than the sender or recipient of said email who had at least one of access permissions or actual access to said email, said email communication item events comprising at least one of:
    creating email communication items;
    sending email communication items;
    receiving email communication items;
    reading email communication items;
    modifying email communication items;
    deleting email communication items;
    opening email communication items;
    forwarding email communication items; and
    saving email communication items.

30. An enterprise email governance method according to claim 29 and wherein said email communication item access permissions include email communication item modification permissions.

31. An enterprise email governance method according to claim 29 and wherein said email communication item access permissions include email communication item creation and deletion permissions.

32. An enterprise email governance method according to claim 29 and wherein said email communication item access permissions include email communication item sending, replying and forwarding permissions.

33. An enterprise email governance method according to claim 29 and wherein said email communication item access permissions include email communication item reading permissions.

34. An enterprise email governance method according to claim 29 and wherein said method includes providing at least near real time indications of email communication item events involving selected at least pairs of entities.

35. An enterprise email and file governance method useful with enterprise email systems in which multiple users have access to at least some email communication items, the method comprising:
  monitoring email servers and identifying a first plurality of entities in the enterprise who have actually accessed emails as well as a second plurality of entities in the enterprise who have access permissions to emails, said first plurality of entities being a subset of said second plurality of entities, said second plurality of entities comprising entities other than senders or recipients of said emails, providing identification of the entity other than the sender or recipient of said email who had at least one of access permissions or actual access to said email, and providing at least one of:
    at least near real time indications of email communication item events associated with said first and second plurality of entities, said email communication item events comprising at least one of:
      creating email communication items;
      sending email communication items;
      receiving email communication items;
      reading email communication items;
      modifying email communication items;
      deleting email communication items;
      opening email communication items;
      forwarding email communication items; and
      saving email communication items; and
    indications of email communication item access permissions associated with said second plurality of entities, said email communication item access permissions comprising user access permissions for at least one of:
      creating email communication items;
      sending email communication items;
      reading email communication items;
      modifying email communication items;
      deleting email communication items;
      opening email communication items; and
      forwarding email communication items;
  monitoring files across the enterprise and providing at least one of:
    at least near real time indications of file access events; and
    indications of file access permissions; and
  storing enterprise-wide monitored events and providing at least near real time user accessibility to said email communication items and to at least one of said email communication item access events, said indications of email communication item access permissions, said file access events and said indications of file access permissions.

36. An enterprise email governance method according to claim 35 and wherein said at least near real time user accessibility to said email communication items and to at least one of said email communication item access events and said indications of email communication item access permissions includes filtering functionality operative to provide at least near real time user accessibility to said email communication items, and to said access events and said access permissions thereof, which match at least one of a multiplicity of email communication items filtering criteria.

37. An enterprise email governance method according to claim 36 and wherein said multiplicity of email communication items filtering criteria includes keywords.

38. An enterprise email governance method according to claim 36 and wherein said multiplicity of email communication items filtering criteria includes email communication item send time.

39. An enterprise email governance method according to claim 36 and wherein said multiplicity of email communication items filtering criteria includes email communication item receive time.

40. An enterprise email governance method according to claim 36 and wherein said multiplicity of email communication items filtering criteria includes email communication item recipients.

41. An enterprise email governance method according to claim 36 and wherein said multiplicity of email communication items filtering criteria includes email communication item sender.

42. An enterprise email governance method according to claim 36 and wherein said multiplicity of email communication items filtering criteria includes email communication item subject.

43. An enterprise email governance method according to claim 36 and wherein said multiplicity of email communication items filtering criteria includes email communication item attachments characteristics.

44. An enterprise email governance method according to claim 43 and wherein said communication item attachments characteristics include attachment size, attachment subject and attachment content.

* * * * *